US012744810B2

(12) United States Patent
Sodja

(10) Patent No.: US 12,744,810 B2
(45) Date of Patent: Sep. 22, 2026

(54) ABUSE SCORING SYSTEM AND METHODS

(71) Applicant: BeyondTrust Corporation, Johns Creek, GA (US)

(72) Inventor: Cole Sodja, Johns Creek, GA (US)

(73) Assignee: BeyondTrust Corporation, Johns Creek, GA (US)

( * ) Notice: Subject to any disclaimer, the term of this patent is extended or adjusted under 35 U.S.C. 154(b) by 8 days.

(21) Appl. No.: 18/883,473

(22) Filed: Sep. 12, 2024

(65) Prior Publication Data

US 2026/0075082 A1 Mar. 12, 2026

(51) Int. Cl.
*H04L 29/06* (2006.01)
*H04L 9/40* (2022.01)

(52) U.S. Cl.
CPC ...... *H04L 63/1441* (2013.01); *H04L 63/1416* (2013.01)

(58) Field of Classification Search
None
See application file for complete search history.

(56) References Cited

U.S. PATENT DOCUMENTS

2015/0373039 A1* 12/2015 Wang .................. H04L 63/1425 726/23
2016/0156641 A1* 6/2016 Kondapalli ........... G06F 21/554 726/22
2019/0012456 A1* 1/2019 Moore ................... G06N 20/00
2019/0332767 A1* 10/2019 Wardman ................ G06F 21/41
2020/0137110 A1* 4/2020 Tyler ..................... H04L 63/145
2020/0358819 A1* 11/2020 Bowditch ............... G06F 17/18
2020/0366712 A1* 11/2020 Onut ...................... G06N 3/084
2022/0006834 A1 1/2022 Kaidi
2022/0215393 A1 7/2022 Lenkala et al.
2022/0327186 A1 10/2022 Tomoda
2024/0163396 A1 5/2024 Viswanathan et al.
2024/0340316 A1* 10/2024 Gerovich ................ H04L 63/20

FOREIGN PATENT DOCUMENTS

CN 108377241 B * 2/2021 ......... H04L 63/1425
CN 114581086 A * 6/2022 ....... G06F 18/24147

OTHER PUBLICATIONS

International Search Report and Written Opinion in International application No. PCT/US24/47966.

* cited by examiner

*Primary Examiner* — Benjamin E Lanier
(74) *Attorney, Agent, or Firm* — Bradley Arant Boult Cummings LLP; Adam J. Thompson, Esq.; Daniel E. Sineway, Esq.

(57) ABSTRACT

A computing device can receive network data including one or more IP addresses. The computing device can determine a training set based on the network data and train a machine learning algorithm on the training set. The computing device can receive a request to access one or more computing resources. The computing device can apply the machine learning algorithm to the request to determine an abuse score. Based on the abuse score exceeding a predetermined threshold, the computing device can perform a remedial action.

18 Claims, 4 Drawing Sheets

100

| IP ADDRESS (103) | ACCOUNT (106) | ABUSE (109) | CONFIDENCE (112) | ACTION (115) |
|---|---|---|---|---|
| 184.230.165.223 | ALPHA CO. | YES | 99 | ALERT |
| 44.234.71.115 | GAMMA INC. | YES | 93 | BLOCK |
| 195.39.87.165 | DELTA LLC | NO | 82 | NONE |
| 1.208.13.161 | GAMMA INC. | NO | 99 | NONE |
| 125.186.195.174 | BETA LLC | YES | 95 | ALERT |
| 59.95.30.133 | ALPHA CO. | NO | 85 | NONE |
| 138.66.121.139 | DELTA LLC | NO | 98 | NONE |
| 26.158.173.147 | BETA LLC | YES | 70 | SUSPEND |
| 14.178.142.118 | GAMMA INC. | YES | 99 | ALERT |
| 99.75.111.22 | DELTA LLC | NO | 96 | NONE |

FIG. 1

ABUSE SCORING SYSTEM AND METHODS

TECHNICAL FIELD

The present systems and processes relate to scoring the risk of abuse for IP addresses attempting to access computing resources.

BACKGROUND

Computing resources, such as networks, endpoint devices, firewalls, and identity and access management systems, present a risk of abuse. Malicious actors may attempt to perpetuate phishing campaigns, distributed denial of service attacks, brute force attacks, and other types of abuse against computing resources. In many instances, malicious actors may attempt to gain access to computing resources via computing device over a network. Each computing device connected to a network is associated with an IP address. Thus, certain IP addresses can gain a reputation for abuse. For example, IP addresses associated with certain countries or internet service providers may have poor reputations for risks of abuse.

Reputation risk databases provide reputation scores for IP addresses. However, access to these databases require subscription fees. Further, accessing the reputation risk databases is time consuming and computationally intensive. Whenever a computing resource receives a request for access, a $3^{rd}$ party API service has to call into the reputation risk databases to receive a score. However, receiving a response from the API service can take minutes, which can slow down legitimate access to the computing resource. As an example, requesting reputation scores for ten thousand IP addresses from reputation risk databases using a $3^{rd}$ party API service and receiving a response can take an average of 20 to 30 minutes. Additionally, the reputation risk databases don't account for the requests actually received by the computing resources. Moreover, the scoring systems used by reputation risk databases is inconsistent. Different databases may provide different scores, which may cause inconsistent outcomes.

Therefore, there is a long-felt but unresolved need for an abuse scoring system that reduces the computational requirements, includes consistent scoring methods, and accounts for the requests received by computing resources.

BRIEF SUMMARY OF THE DISCLOSURE

Briefly described, and according to one embodiment, aspects of the present disclosure generally relate to determining an abuse scoring system. The abuse scoring system can determine an abuse score for IP addresses attempting to access a computing resource. The abuse score can indicate the likelihood that the device associated with the IP address will abuse the computing resource or represents a risk of abuse or attacks against the computing resource. As an example, the computing resources can include endpoint devices, firewalls, networks, and cloud-based identity and access management services. As will be understood, the abuse scoring system can reduce the computational resources required to determine if multiple IP addresses present a risk of abuse by a scale of 20 to 30 minutes in an hour. As an example, the abuse scoring system can return a risk of abuse score for multiple IP addresses (e.g., upwards to ten thousand IP addresses) in a minute or less.

The abuse scoring system can apply a trained machine learning algorithm to requests to access the computing resources. The machine learning algorithm can be trained using reputation data from the reputation risk databases and historical request data associated with the computing resources. The machine learning algorithm can be trained initially and retrained periodically (e.g., once a month, once a quarter) based on updated data reputation risk databases and recent request data. The initial training and periodic retraining can eliminate the need to call into the reputation risk databases each time a device attempts to access the computing resources. Additionally, training the machine learning algorithm on request data from requests to access the computing resources can account for the nuances associated with each computing resource (e.g., some computing resources present a higher risk of abuse, some computing resources can be vulnerable to different types of attacks).

The abuse scoring system can determine a training set from the reputation data and historical request data. The abuse scoring system can apply feature engineering techniques to the reputation data and historical request data to determine the training set. For example, the abuse scoring system can impute missing values, encode categorical values, and scale the data. As another example, the abuse scoring system can calculate internet service provider and country scores for the IP addresses included in the training set.

The abuse scoring system can apply the trained machine learning algorithm to the requests to access the computing resources. The requests can include the IP address associated with the device attempting to access the computing resources associated with an account. The machine learning algorithm can determine an abuse score for the IP address included in the request. The abuse score can include a binary indicator and a confidence score. The binary indicator can represent the risk or likelihood that the device associated with the IP address from the request will abuse the computing resources. The binary indicator can include any binary indication (e.g., yes or no, with yes indicating that abuse is likely, true or false, with true indicating that abuse is likely). The confidence score can indicate the confidence, as a percentage, that the binary indicator is accurate or correct.

The abuse scoring system can allow accounts to set predefined rules based on the abuse scores. The abuse scoring system can perform a remedial action based on the predefined rules associated with the account. If the abuse score exceeds a predetermined threshold included in the predefined rule, the abuse scoring system can perform a remedial action, including, but not limited to, logging the request and abuse score, displaying the request and abuse score on a dashboard associated with the account, transmitting an alert and/or notification to the account, blocking the IP address from accessing to the computing resources, or suspending the IP address from accessing the computing resources for a predetermined period of time.

The above and further features of the disclosed systems and methods will be recognized from the following detailed descriptions and drawings of various embodiments.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 1 illustrates an abuse scoring system according to various embodiments of the present disclosure.

DETAILED DESCRIPTION

Figure 2:
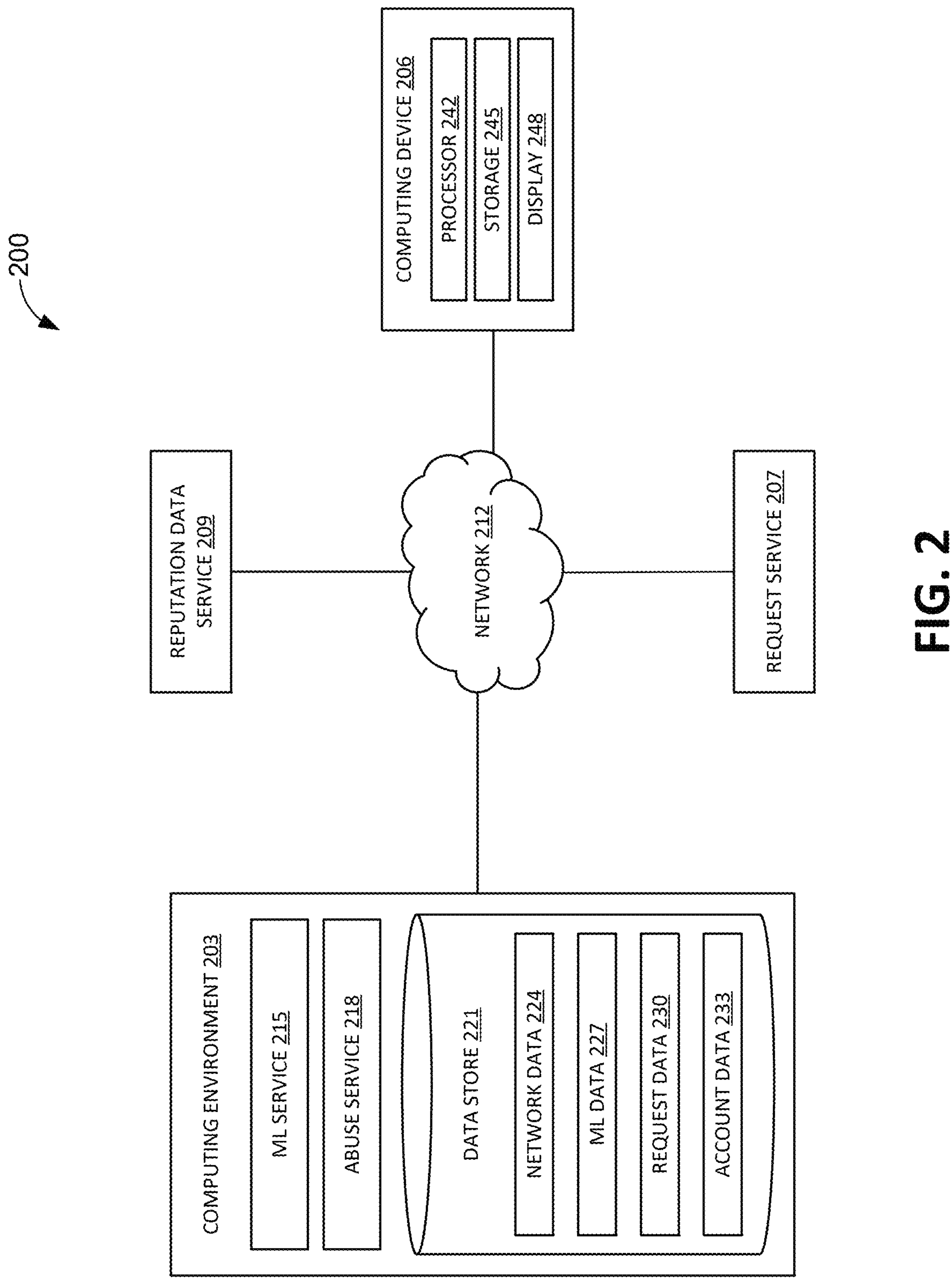
FIG. 2 illustrates an exemplary networked environment for the disclosed system according to various embodiments of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Exemplary Embodiments

Referring now to the figures, for the purposes of example and explanation of the fundamental processes and components of the disclosed systems and processes, reference is made to FIG. 1, which illustrates the exemplary abuse scoring system 100 ("system 100"). As discussed further herein, the system 100 can determine an abuse score for a device associated with an IP address attempting to access a computing resource. The abuse score can indicate the likelihood that the device associated with the IP address will abuse the computing resource or represents a risk of abuse. The computing resources can include, but are not limited to, endpoint devices, firewalls, networks, and cloud-based identity and access management services (e.g., Azure Active Directory, Okta, Amazon Web Services). Abusing the computing resource can include, but is not limited to, phishing campaigns, distributed denial of service attacks, establishing command and control servers, reconnaissance, password spray attempts (e.g., brute force attacks), escalation of privilege attacks, and malware and ransomware attacks.

The system 100 can receive a request to access a computing resource. The request can include the IP address 103 associated the device attempting to access the computing resource. As will be understood by those having skill in the art, the IP address 103 can indicate the country of origin for the request and the internet service provider (ISP) associated with the IP address 103. In some embodiments, the IP address 103 can indicate a specific city or region within the country of origin, whether the IP address 103 is associated with a residential, commercial, mobile, or public network, and/or whether the IP address 103 is associated with a web hosting service, proxy server, or VPN service. The request can include credentials for accessing the computing resource. The system 100 can determine an account 106 associated with the computing resource attempting to be accessed by the device associated with the IP address 103.

To determine the abuse score, the system 100 can apply a trained machine learning algorithm to the request. The system 100 can determine the abuse score by applying the trained machine learning algorithm to the IP address 103 included in the request without any other data included in the request. In some other embodiments, the system 100 can determine the abuse score by applying the trained machine learning algorithm to the IP address 103 and other data included in the request or related to the request, including but not limited to, the computing resource attempting to be accessed, the account 106 associated with the computing resource, the credentials, and the time of the request.

The abuse score can include a binary indicator 109 and a confidence score 112. The binary indicator 109 can indicate that the IP address 103 represents a risk of abusing the computing resource. The binary indicator 109 can include a yes or no (e.g., yes can indicate that the IP address 103 represents a risk of abuse, no can indicate that the IP address 103 does not represent a risk of abuse), or a true or false (e.g., true can indicate that the IP address 103 represents a risk of abuse, false can indicate that the IP address 103 does not represent a risk of abuse). The confidence score 112 can indicate the confidence that the binary indicator 109 is accurate as a percentage out of 100%. For example, a confidence score 112 of 95% to 99% can indicate a high confidence that the binary indicator 109 associated with the confidence score 112 is accurate.

Based on the binary indicator 109 and the confidence score 112, the system 100 can perform a remedial action 115. For example, each account for the system 100 can be associated with a predefined rule including a predefined threshold and remedial action. If the abuse score exceeds the predefined threshold, the system 100 can perform the remedial action in response. As an example, a predefined rule can include, if the binary indicator 109 is yes and the confidence score 112 is 80% or higher, the system 100 can transmit an alert to the account 106 as the remedial action 115. As another example, a predefined rule can include, if the binary indicator 109 is yes and the confidence score 112 is 90% or higher, the system 100 can block the device associated with the IP address 103 from accessing the computing resource as the remedial action 115.

As will be understood, the IP addresses 103, accounts 106, abuse indicators 109, confidence metrics 112, and remedial actions 115 illustrated by FIG. 1 are merely exemplary and illustrative of the functions and operations of the system 100.

Referring now to FIG. 2, shown is an exemplary networked environment 200 for the abuse scoring system according to various embodiments of the present disclosure. As will be understood and appreciated, the exemplary networked environment 200 shown in FIG. 2 represents merely one approach or embodiment of the present system, and other aspects are used according to various embodiments of the present system. Exemplary networked environment 200 can include, but is not limited to, a computing environment 203 connected to one or more computing devices 206, a request service 2017, and a reputation data service 209 over a network 212.

The elements of the computing environment 203 can be provided via one or more computing devices that may be arranged, for example, in one or more server banks or computer banks or other arrangements. Such computing devices can be located in a single installation or may be distributed among many different geographical locations. For example, the computing environment 203 can include one or more computing devices that together may include a hosted computing resource, a grid computing resource, or any other distributed computing arrangement. In some cases, the computing environment 203 can correspond to an elastic computing resource where the allotted capacity of processing, network, storage, or other computing-related resources may vary over time. Regardless, the computing environment 203 can include one or more processors and memory having instructions stored thereon that, when executed by the one or more processors, cause the computing environment 203 to perform one, some, or all of the actions, methods, steps, or functionalities provided herein.

The computing environment 203 can include a ML service 215, an abuse service 218, and a data store 221. The ML service 215 and the abuse service 218 can correspond to one or more software executables that can be executed by the computing environment 203 to perform the functionality described herein. While the ML service 215 and the abuse service 218 are described as different services, it can be appreciated that the functionality of these services can be implemented in one or more different services executed in the computing environment 203. Various data can be stored in the data store 221, including but not limited to, the network data 224, the ML data 227, the request data 230, and the account data 233.

The ML service 215 can use the network data 224 to determine a training set for a machine learning algorithm. The network data can include data associated with multiple IP addresses. In some embodiments, the network data can include data associated with hundreds of thousands of IP addresses or more. The network data can include reputation data and historical request data. The reputation data can be provided by the reputation data service 209. The historical request data can include any historical requests and associated data. For example, each request included in the historical request data can include the IP address, credentials, the requested computing resource, an account associated with the requested computing resource, and/or a date and time of the request. In some embodiments, each request can include an abuse score previously determined by the abuse scoring system and an accuracy indication (e.g., an indication of whether the abuse score was accurate). In some embodiments, the requests included in the historical request data can be associated with one account. In some other embodiments, the requests included in the historical request data can be associated with multiple accounts.

The ML service 215 can determine the training set by applying various feature engineering techniques to the network data 224. For example, the ML service 215 can impute missing variables and impute numerical scores for categories included in the network data 224. As another example, the ML service 215 can use the network data 224 to calculate subscores to include as features in the training sets. The ML service 215 can apply a machine learning algorithm to the network data 224 to calculate an ISP score and a country of origin score. The ML service 215 weight the selected features from the network data 224. For example, the ML service 215 can weigh more recent network data 224 more than older network data 224. As will be understood, the ML service 215 can exclude some of the network data 224 from the training set to be used for validating or cross-validating the machine learning algorithm. The ML service 215 can train the machine learning algorithm using the training set to determine an abuse score. For example, the machine learning algorithm can include an ensemble of trees model, including Bayesian additive regression trees.

The abuse score 218 can receive requests to access the computing resources. The computing resources can include, but are not limited to, endpoint devices, firewalls, networks, and cloud-based identity and access management services (e.g., Azure Active Directory, Okta, Amazon Web Services). The requests can include sign-in or authentication attempts for accessing the computing resources. The requests can include the computing resource attempting to be accessed, the IP address associated with the request, and the credentials.

The abuse score 218 can apply the trained machine learning algorithm to the request to determine an abuse score. The abuse score can include a binary indicator and a confidence score. In some embodiments, the binary indicator can correspond to a likelihood score meeting or exceeding a preconfigured threshold score. The binary indicator can represent the risk or likelihood that the device associated with the IP address from the request will abuse the computing resources. The binary indicator can include any binary indication (e.g., yes or no, with yes indicating that abuse is likely, true or false, with true indicating that abuse exceeds a predefined threshold). The confidence score can indicate the confidence, as a percentage, that the binary indicator is accurate or correct.

The abuse score 218 can determine if the abuse score exceeds a predetermined threshold associated with a predefined rule and account. If the abuse score exceeds the predetermined threshold, the abuse score 218 can perform a remedial action. Based on the predefined rule, the remedial action can includes, but is not limited to, logging the request and abuse score as the account data 233, displaying the request and abuse score on a dashboard associated with the account, transmitting an alert and/or notification to the account, blocking the IP address from accessing to the computing resources, or suspending the IP address from accessing the computing resources for a predetermined period of time.

According to various embodiments, the computing device 206 can include any device capable of accessing network 212 including, but not limited to, a computer, smartphone, tablets, or other device. The computing device 206 can include a processor 242 and storage 245. The computing device 206 can include a display 248 on which various user interfaces can be rendered to allow users to configure, monitor, control, and command various functions of networked environment 200. In various embodiments, computing device 206 can include multiple computing devices. Regardless, the computing device 206 can include one or more processors and memory having instructions stored thereon that, when executed by the one or more processors, cause the computing device 206 to perform one, some, or all of the actions, methods, steps, or functionalities provided herein.

The request service 207 can transmit the requests from the computing resources to the abuse service 218. As will be understood, the requests to access the computing resources can be initially received by the computing resources itself or an access service controlling access to the computing resource. The requests can include sign-on or authentication attempts for accessing the computing resources. The requests can be received by the request service 207 for transmission to the abuse service 218.

The reputation data service 209 can compile reputation data from various IP address reputation sources. The reputation data can indicate a reputation for each IP address included in the reputation data. The reputation can indicate a history of abuse associated with the IP address and/or a likelihood that a device associated with the IP address will abuse a computing resource. For example, the reputation can include a numerical score or an abuse indicator, including but not limited to, normal, anomalous, suspicious, risky, and/or malicious. As will be understood, the numerical scoring and abuse indicators provided by the reputation data service 209 may not be consistent across various sources. As an example, if the reputation data service 209 includes multiple sources, the abuse indicator "anomalous," from one source can have a different meaning than the same abuse indicator from a different source.

The network 212 includes, for example, the Internet, intranets, extranets, wide area networks (WANs), local area networks (LANs), wired networks, wireless networks, or other suitable networks, etc., or any combination of two or more such networks.

Figure 3:
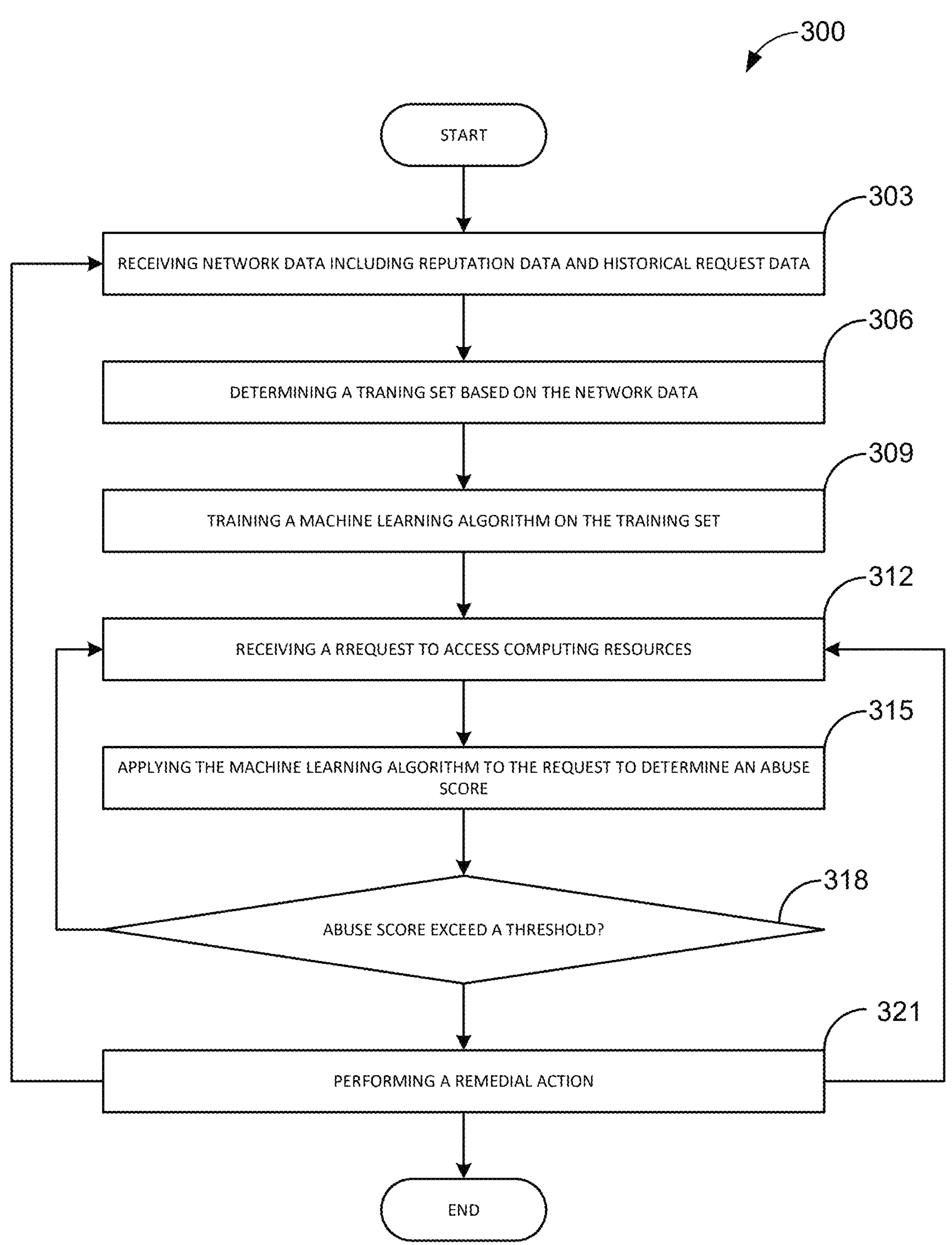
FIG. 3 illustrates an exemplary abuse scoring process for the disclosed system according to various embodiments of the present disclosure.

Referring now to FIG. 3, shown is an exemplary, process 300 for determining an abuse score according to various embodiments of the present disclosure. As will be understood by one having ordinary skill in the art, the steps and processes shown in FIGS. 3 and 4 may operate concurrently and continuously, are generally asynchronous and independent, can be performed in part or in whole by a combination of one or more of the computing environment 203, the computing device 206, the request service 207, and the reputation data service 209 and are not necessarily performed in the order shown and various steps can be executed linearly or in parallel. Process 300 can be performed entirely, partially, or in coordination with the ML service 215 and the abuse service 218.

At step 303, the process 300 can include receiving network data. The ML service 215 can receive the network data 224. The network data can include data associated with multiple IP addresses. In some embodiments, the network data can include data associated with hundreds of thousands of IP addresses or more. The network data can include reputation data and historical request data. The reputation data can be provided by the reputation data service 209. The reputation data can indicate a reputation for each IP address included in the reputation data. The reputation can indicate a history of abuse associated with the IP address and/or a likelihood that a device associated with the IP address will abuse a computing resource. For example, the reputation can include a numerical score or an abuse indicator, including but not limited to, normal, anomalous, suspicious, risky, and/or malicious. As will be understood, the numerical scoring and abuse indicators provided by the reputation data service 209 may not be consistent across various sources. As an example, if the reputation data service 209 includes multiple sources, the abuse indicator "anomalous," from one source can have a different meaning than the same abuse indicator from a different source.

The historical request data can include any data related to requests previously received by the abuse scoring system. Each request included in the historical request data can include the IP address, credentials, the requested computing resource, an account associated with the requested computing resource, and/or a date and time of the request. In some embodiments, each request can include an abuse score previously determined by the abuse scoring system and an accuracy indication (e.g., an indication of whether the abuse score was accurate). In some embodiments, the requests included in the historical request data can be associated with one account. In some other embodiments, the requests included in the historical request data can be associated with multiple accounts. The reputation data and the historical request data can include location data and ISP data associated with each IP address included in the reputation data and historical request data. As will be understood, each IP address can be decoded to indicate a country of origin, a region of a country, and/or specific city. Each IP address can be associated with ISP and the reputation data and the historical request data can include metadata for the ISP.

The network data can include threat intelligence feeds. For example, threat intelligence feeds can provide real-time data associated with risks of abuse for IP addresses. Threat intelligence feeds can be specific to an account or include a publicly-accessible feed. The network data can include intrusion detection system data associated with specific accounts. For example, the intrusion detection system data can include suspicious traffic, activity, and/or access attempts associated with a specific account.

At step 306, the process 300 can include determining a training set based on the network data. The ML service 215 can determine a training set based on the network data. As will be understood, the training set can be used to train a machine learning algorithm to determine an abuse score for an IP address. Determining the training set can include performing one or more feature engineering techniques to the network data, including but not limited to, imputing missing values, encoding variables, data scaling, and data normalization. Determining the training set can include determining new features, including calculating subscores, including but not limited to a country scores and ISP scores. The features can be selected for inclusion in the training set and weighted based on the importance of each feature. The training set can include a recency bias. For example, more recent network data can be weighted higher than older network data. The training set can be saved as the ML data 227. Determining the training set will be discussed further herein with reference to FIG. 4.

At step 309, the process 300 can include training a machine learning algorithm on the training set. The ML service 215 can train a machine learning algorithm on the training set. The machine learning algorithm can include an ensemble of trees model, including Bayesian additive regression trees. In some other embodiments, the machine learning algorithm can include but not limited to nearest neighbor, support vector machines, gradient boosting, neural networks, logistic regression, linear regression, decision trees, random forest, Naive Bayes, k-means clustering, time series regression, pointwise prediction, stepwise regression, Gaussian models, hidden Markov models, ensemble learning models, means-shift clustering, and Bayesian models. In some embodiments, the machine learning algorithm can include any deep learning model, graphical model, and/or distributional regression model capable of calibrated probabilities (e.g., accurate predict the probability or likelihood of abuse) and multi-modal distributions. In some embodiments, the machine learning algorithm can include meta-learning or combining multiple types of algorithms to form ensemble voting models, using techniques including but not limited to bagging, boosting, and/or stacking.

As will be understood by those having skill in the art, training the machine learning algorithm can include performing validating or cross-validating the machine learning algorithm. For example, a portion of the network data or the training set can be held out from training the machine learning algorithm. Once the trained machine learning algorithm meets an accuracy threshold, the trained machine learning algorithm can be validated or cross-validated using the portion of the network data or training set held back during the training process. In some embodiments, the accuracy threshold can include 95% or higher accuracy for abuse scores with a 60% or higher confidence metric. The trained machine learning algorithm can be saved as the ML data 227.

At step 312, the process 300 can receive a request to access one or more computing resources. The abuse service 218 can receive the request to access the one or more computing resources from the request service 207. For example, the request can include a sign in request for the computing resources. The request can include the requested computing resources, the IP address associated with the device attempting to access the computing resources, and credentials. As will be understood, the credentials can be authentic or inauthentic credentials for accessing the computing resources. The abuse service 218 can determine data associated with the request, including but not limited to, the date and time of the request, the account associated with the requested computing resources, and the ISP address and the country of origin associated with the IP address. In some embodiments, the abuse service 218 can determine a specific city or region within the country of origin, whether the IP address is associated with a residential, commercial, mobile, or public network, and/or whether the IP address is associated with a web hosting service, proxy server, or VPN service. The request can be saved as the request data 230.

At step 315, the process 300 can apply the trained machine learning algorithm to the request to determine an abuse score. The abuse service 218 can apply the trained machine learning algorithm to the request to determine an abuse score. The trained machine learning algorithm can be applied to any of the data included in the received request or any data associated with the request. By applying the trained machined learning algorithm to the request, the abuse service 218 can determine an abuse score. The abuse score can include a binary indicator and a confidence score. The binary indicator can represent the risk or likelihood that the device associated with the IP address from the request will abuse the computing resources. The binary indicator can include any binary indication (e.g., yes or no, true or false). The confidence score can indicate the confidence, as a percentage, that the binary indicator is accurate or correct. For example, an abuse score with a confidence score of 99% can indicate a higher confidence that the abuse score is correct compared to an abuse score with a confidence score of 70%. The abuse score can be saved with the associated request as the request data 230.

At step 318, the process 300 can include determining if the abuse score exceeds a predetermined threshold. The abuse service 218 can determine if the abuse score exceeds a predetermined threshold. Each account can be associated with one or more predefined rules saved in the account data 233. As an example, each account can be associated with multiple predefined rules. The predefined rules can be associated with particular hosts, group roles, and/or domains. Each predefined rule can include a predefined threshold and a remedial action. If the abuse score exceeds the predefined threshold, the process 300 can proceed to the step 321 and perform the remedial action. As an example, the predefined rule can indicate that the remedial action should be performed if the abuse indicator is yes (e.g., abuse more likely than not) and the confidence metric is above a defined percentage. As another example, the predefined rule can indicate the remedial action should be performed if the abuse indicator is yes regardless of the confidence metric. If the abuse score does not exceed the predefined threshold, the process 300 can return to step 312 and repeat steps 312-318.

As an example, the predefined rule can indicate that the remedial action should not be performed if the abuse indicator is yes and the confidence metric is below a defined percentage. As another example, the predefined rule can indicate the remedial action should not be performed if the abuse indicator is no (e.g., abuse is not likely) regardless of the confidence metric. As will be understood, the abuse service 218 can apply the predefined rules associated with the account associated with the requested computing resources.

At step 321, the process 300 can performing a remedial action. The abuse service 218 can the remedial action based on the predefined rule associated with the account. The remedial action can include, but is not limited to, logging the request and abuse score as the account data 233, displaying the request and abuse score on a dashboard associated with the account, or transmitting an alert and/or notification to the account. In some other embodiments, the remedial action can include, but is not limited to, blocking the IP address from accessing to the computing resources or suspending the IP address from accessing the computing resources for a predetermined period of time.

As will be understood, the process 300 can return to the step 312 and repeat the steps 312-321. In some embodiments, the process 300 return to the step 303. In these embodiments, the network data and the training set can be updated to include recent requests and abuse scores. For example, any recent requests and abuse scores can be added to the historical request data. As another example, the ML service 215 can receive updated reputation data from the reputation data service 209. The updated network data can be used to update the training set or create a new training set for retraining the machine learning algorithm. Retraining the machine learning algorithm will be discussed further herein with reference to FIG. 4.

Figure 4:
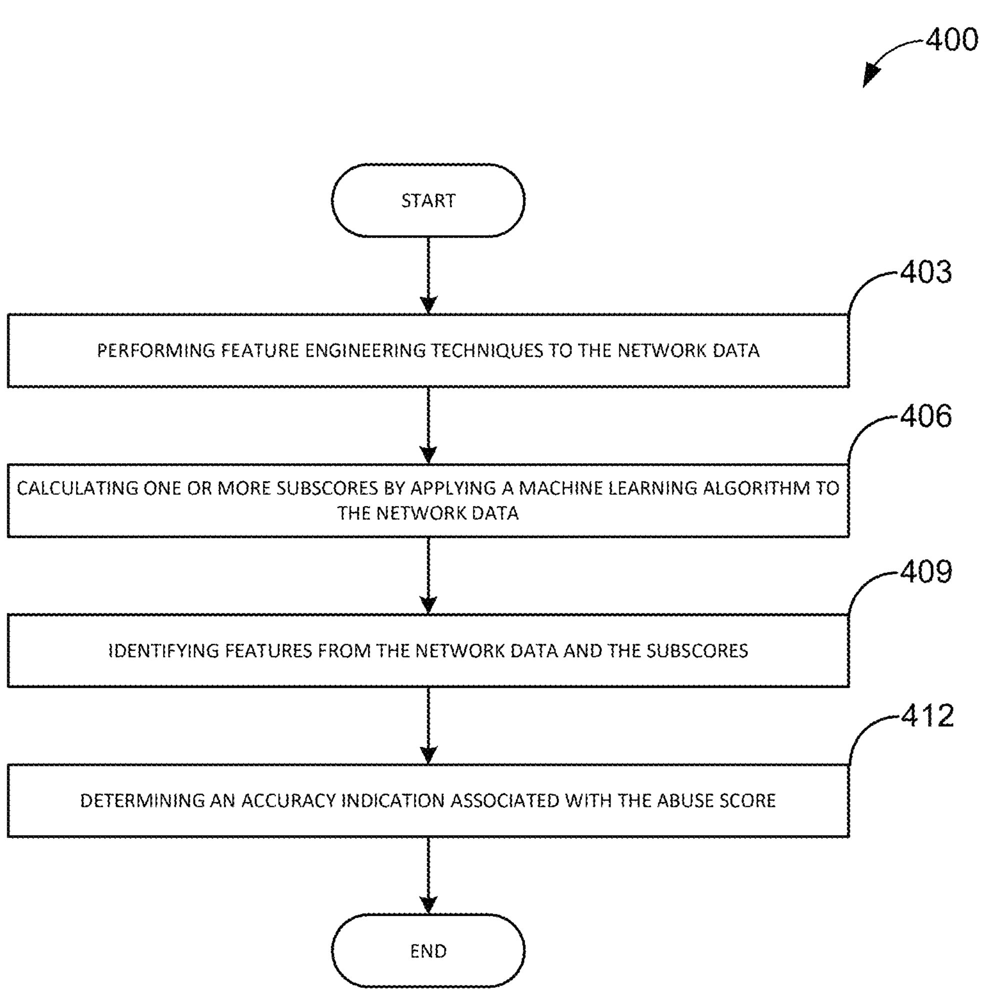
FIG. 4 illustrates an exemplary process for creating a training set for the disclosed system according to various embodiments of the present disclosure.

Referring now to FIG. 4, shown is an exemplary process 400 for creating a training set according to various embodiments of the present disclosure. The process 400 can be performed entirely, partially, or in coordination with the ML service 215 and the abuse score 218. At step 403, the process 400 can include performing one or more feature engineering techniques to the network data. The ML service 215 can perform one or more feature engineering techniques to the network data. The feature engineering techniques can include, but are not limited to, imputing missing values, encoding variables, data scaling, and data normalization. For example, the ML service 215 can impute missing values in the network data using K-nearest neighbors. As another example, the ML service 215 can encode categorial variables in the reputation data using techniques, including but not limited to, one-hot encoding, label encoding, target encoding, binary encoding. If the reputation data includes categorical abuse indicators (e.g., normal, anomalous, suspicious, risky, and/or malicious), the ML service 215 can encode a numerical value for each indicator. As another example, if each source of reputation data uses a different scale for numerical scores, the ML service 215 can use min-max scaling so that the reputation data uses the same scale. As another example, the ML service 215 can use probabilistic scaling to convert the reputation data from multiple sources to a true positive or negative and combine the probabilities from each source to estimate a joint distribution.

As another example, the ML service 215 can perform custom feature engineering. The ML service 215 can look up and add new data to the network data, including ISP data and location data associated with each IP address in the network data, whether the IP address is public or private, data related to the IP address infrastructure (e.g., TOR, data center). As another example, the ML service 215 can perform custom engineering to the historical request data by adding data related to previous abuse and/or attacks. The ML service 215 can add data related to the types of attacks and recency. As another example, the ML service 215 can perform custom feature engineering based on the account. The ML service 215 can add data related to sign in activity, the computing resources, and the associated privileges. As another example, the ML service 215 can aggregate counts of failed authentications, successful authentications, targeted computing resources, and the types and/or volume of networks with IP addresses attempting to access the computing resources. As another example, the ML service 215 can cluster IP addresses based on the network infrastructure and the types and/or timing of attempts to access the computing resources.

At step 406, the process 400 can include calculating one or more subscores by applying a machine learning algorithm to the network data. The ML service 215 can calculate one or more subscores by applying a machine learning algorithm to the network data. As will be understood, an IP address can indicate an ISP and a country of origin. Based on the reputation for each IP address included in the reputation data, the machine learning algorithm can calculate an ISP score and a country score. For example, ISPs associated with IP addresses with poor reputation scores (e.g., malicious) can have a lower ISP score than ISPs associated with IP addresses with favorable reputation scores (e.g., normal, not abusive). As another example, countries associated with IP addresses with poor reputation scores (e.g., malicious) can have a lower country scores than countries associated with IP addresses with favorable reputation scores (e.g., normal, not abusive). In some embodiments, the ML service 215 can assign each country to a bin from a set of country reputation bins. The ML service 215 can assign them based on the reputation scores fitting within mutually exclusive ranges of scores associated with each of the bins. The ML service 215 can adjust the scores of IP addresses from each country based on the bin in which it is assigned. For example, the ML service 215 can reduce a reputation score by a first amount for a first IP address from a first country in a bottom country reputation bin, while raising a reputation score by a second amount for a second IP address from a second country in a top country reputation bin. As another example, the ML service 215 can calculate an infrastructure score by applying a machine learning algorithm to the network data. For example, if certain types of infrastructure are associated with abuse, IP addresses using that type of infrastructure can have a lower score than IP addresses using different types of infrastructure. As another example, the ML service 215 can calculate a prior threat score by applying a machine learning algorithm to the network data. For example, if a particular IP address is associated with prior threats, the particular IP address can have a lower prior threat score than an IP address without a history of prior threats. As another example, the ML service 215 can calculate a vulnerability score for the computing resources by applying a machine learning algorithm to the network data. For example, if a particular computing resource is vulnerable to abuse or has been previously targeted, the particular computing resource can have a lower vulnerability score than other computing resources.

At step 409, the process 400 can include identifying features from the network data and subscores for inclusion in the training data. The ML service 215 can identify features from the network data and subscores for inclusion in the training data. Identifying features can include weighting features. As will be understood, not all features may be included in the training set and not all included features may be weighted the same. The identified features can be used to create insights related to the data sources (e.g., the accuracy, completeness of data) for both the reputation data and the historical request data.

For example, the features can include the source of the network data (e.g., reputation data, historical request data) and the computing resources. As another example, the features can include the ISP score and the country score. As another example, the features can include the number of different credentials (e.g., user identifiers) associated with an IP address from the historical request data. As another example, the features can include the number of abuse indicators or negative reputation indicators (e.g., suspicious, malicious) associated with an IP address. The abuse indicators and negative reputation indicators can be weighted based on the reputation indicator or the associated confidence metric. As another example, the features can include the number of failed authentication events (e.g., failed sign-ins to access the computing resources) associated with each IP address, weighted based on the reason of failure. As another example, the features can include recency for the reputation data and historical request data. The more recent reputation data and historical request data can be weighted higher than older reputation data and historical request data. As another example, the features can include the number days with authentication (e.g., request to access the computing resources) attempts associated with each IP address. As another example, the features can include the number of successful authentication attempts (e.g., successful attempts to access the computing resources). As another example, the features can include the number of different accounts with failed authentication attempts associated with each IP address. As another example, the features can include the different agents associated with each request. As will be understood, the agents can include the browser or application being used to transmit the requests.

At step 412, the process 400 can include determining an accuracy indication associated with the abuse scores. The ML service 215 can determine an accuracy indication associated with the abuse scores included in the historical request data. As will be understood, the step 412 can be optional and performed when retraining the machine learning algorithm. The step 412 may not be performed when initially training the machine learning algorithm. The accuracy indication can represent the accuracy of the abuse score. For example, accounts can report actual abuse to the ML service 215. For example, if the abuse score is positive and the account report actual abuse, the accuracy indication can be positive (e.g., the abuse score was accurate). As another example, if the abuse score is negative and the account reports actual abuse, the accuracy indication can be negative (e.g., the abuse score was inaccurate).

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein. While thresholds are discussed herein as being met when the threshold is exceeded, the system may determine a threshold is met when a value meets or exceeds the threshold.

Clause 1. A method, comprising: receiving, via one of one or more computing devices, network data comprising at least one IP address; determining, via one of the one or more computing devices, a training set based on the network data; training, via one of the one or more computing devices, a machine learning algorithm on the training set; receiving, via one of the one or more computing devices, a request to access to one or more computing resources; applying, via one of the one or more computing devices, the machine learning algorithm to the request to determine an abuse score; and based on the abuse score exceeding a predetermined threshold, performing, via one of the one or more computing devices, a remedial action.

Clause 2. The method of clause 1 or any other clause herein, wherein the network data comprises reputation data and historical request data.

Clause 3. The method of clause 2 or any other clause herein, wherein the reputation data comprises a plurality of IP addresses and a binary indication of abuse associated with each of the plurality of IP addresses.

Clause 4. The method of clause 2 or any other clause herein, wherein the historical request data is associated with a plurality of historical requests to access the one or more computing resources.

Clause 5. The method of clause 2 or any other clause herein, wherein the historical request data is associated with a plurality accounts.

Clause 6. The method of clause 1 or any other clause herein, wherein determining the training set comprises: performing, via one of the one or more computing devices, one or more feature engineering techniques to the network data; and identifying, via one of the one or more computing devices, one or more features from the network data.

Clause 7. The method of clause 6 or any other clause herein, further comprising calculating, via one of the one or more computing devices, a service provider score and country score by applying a second machine learning algorithm to the network data.

Clause 8. A system, comprising: a memory device; and at least one computing device communicatively coupled to the memory device, the at least one computing device being configured to: receive network data comprising at least one IP address; determine a training set based on the network data; train a machine learning algorithm on the training set; receive a request to access to one or more computing resources; apply the machine learning algorithm to the request to determine an abuse score; and based on the abuse score exceeding a predetermined threshold, perform a remedial action.

Clause 9. The system of clause 8 or any other clause herein, wherein the one or more computing resources comprises at least one of an endpoint device, a firewall, or a network.

Clause 10. The system of clause 8 or any other clause herein, wherein the request comprises credentials and an IP address of the at least one IP addresses.

Clause 11. The system of clause 8 or any other clause herein, wherein the at least one computing device is further configured to: determine an accuracy indication associated with the abuse score; and train the machine learning algorithm on the accuracy indication and the request.

Clause 12. The system of clause 8 or any other clause herein, wherein the abuse score comprises a binary indication of abuse and a confidence metric.

Clause 13. The system of clause 8 or any other clause herein, wherein the predetermined threshold is associated with an account.

Clause 14. A non-transitory computer-readable medium embodying a program that, when executed by at least one computing device, cause the at least one computing device to: receive network data comprising at least one IP address; determine a training set based on the network data; train a machine learning algorithm on the training set; receive a request to access to one or more computing resources; apply the machine learning algorithm to the request to determine an abuse score; and based on the abuse score exceeding a predetermined threshold, perform a remedial action.

Clause 15. The non-transitory computer-readable medium of clause 14 or any other clause herein, wherein the remedial action comprises transmitting an alert to an account associated with the request.

Clause 16. The non-transitory computer-readable medium of clause 14 or any other clause herein, wherein the remedial action comprises suspending access to the one or more computing resources for a predetermined period of time.

Clause 17. The non-transitory computer-readable medium of clause 14 or any other clause herein, wherein the remedial action comprises blocking access to the one or more computing resources.

Clause 18. The non-transitory computer-readable medium of clause 14 or any other clause herein, wherein the machine learning algorithm comprises an ensemble of trees model.

Clause 19. The non-transitory computer-readable medium of clause 14 or any other clause herein, wherein the training set comprises the one or more computing resources.

Clause 20. The non-transitory computer-readable medium of clause 14 or any other clause herein, wherein the program further causes the at least one computing device to determine an account associated with the request.

These and other aspects, features, and benefits of the claims will become apparent from the detailed written description of the aforementioned aspects taken in conjunction with the accompanying drawings, although variations and modifications thereto may be effected without departing from the spirit and scope of the novel concepts of the disclosure.

What is claimed is:

1. A method, comprising:

receiving, via one of one or more computing devices, network data comprising at least one IP address and suspicious network traffic activity;

determining, via one of the one or more computing devices, a training set based on the network data;

training, via one of the one or more computing devices, a machine learning algorithm on the training set;

receiving, via one of the one or more computing devices, a request to access to one or more computing resources;

determining, via one of the one or more computing devices, a plurality of network-level sub-scores for the at least one IP address, the plurality of sub-scores comprising at least an internet service provider score and a country-of-origin score derived from the network data;

applying, via one of the one or more computing devices, a weighting to each of the plurality of sub-scores and combining the weighted sub-scores using the machine learning algorithm to determine an abuse score for the request; and based on the abuse score exceeding a predetermined threshold, performing, via one of the one or more computing devices, a remedial action comprising at least one of: suspending access to the one or more computing resources for a predetermined period of time or blocking access to the one or more computing resources.

2. The method of claim 1, wherein the network data comprises reputation data and historical request data.

3. The method of claim 2, wherein the reputation data comprises a plurality of IP addresses and a binary indication of abuse associated with each of the plurality of IP addresses.

4. The method of claim 2, wherein the historical request data is associated with a plurality of historical requests to access the one or more computing resources.

5. The method of claim 2, wherein the historical request data is associated with a plurality accounts.

6. The method of claim 1, wherein determining the training set comprises:

performing, via one of the one or more computing devices, one or more feature engineering techniques to the network data; and identifying, via one of the one or more computing devices, one or more features from the network data.

7. The method of claim 6, further comprising calculating, via one of the one or more computing devices, a service provider score and country score by applying a second machine learning algorithm to the network data.

8. A system, comprising:

a memory device; and at least one computing device communicatively coupled to the memory device, the at least one computing device being configured to:

receive network data comprising at least one IP address and suspicious network traffic activity;

determine a training set based on the network data;

train a machine learning algorithm on the training set;

receive a request to access to one or more computing resources;

determine a plurality of network-level sub-scores for the at least one IP address, the plurality of sub-scores comprising at least an internet service provider score and a country-of-origin score derived from the network data;

apply a weighting to each of the plurality of sub-scores and combining the weighted sub-scores using the machine learning algorithm to determine an abuse score for the request; and based on the abuse score exceeding a predetermined threshold, perform a remedial action comprising at least one of: suspending access to the one or more computing resources for a predetermined period of time or blocking access to the one or more computing resources.

9. The system of claim 8, wherein the one or more computing resources comprises at least one of an endpoint device, a firewall, or a network.

10. The system of claim 8, wherein the request comprises credentials and an IP address of the at least one IP addresses.

11. The system of claim 8, wherein the at least one computing device is further configured to:

determine an accuracy indication associated with the abuse score; and train the machine learning algorithm on the accuracy indication and the request.

12. The system of claim 8, wherein the abuse score comprises a binary indication of abuse and a confidence metric.

13. The system of claim 8, wherein the predetermined threshold is associated with an account.

14. A non-transitory computer-readable medium embodying a program that, when executed by at least one computing device, cause the at least one computing device to:

receive network data comprising at least one IP address and suspicious network traffic activity;

determine a training set based on the network data;

train a machine learning algorithm on the training set;

receive a request to access to one or more computing resources;

determine a plurality of network-level sub-scores for the at least one IP address, the plurality of sub-scores comprising at least an internet service provider score and a country-of-origin score derived from the network data;

apply a weighting to each of the plurality of sub-scores and combining the weighted sub-scores using the machine learning algorithm to determine an abuse score for the request; and based on the abuse score exceeding a predetermined threshold, perform a remedial action comprising at least one of: suspending access to the one or more computing resources for a predetermined period of time or blocking access to the one or more computing resources.

15. The non-transitory computer-readable medium of claim 14, wherein the remedial action comprises transmitting an alert to an account associated with the request.

16. The non-transitory computer-readable medium of claim 14, wherein the machine learning algorithm comprises an ensemble of trees model.

17. The non-transitory computer-readable medium of claim 14, wherein the training set comprises the one or more computing resources.

18. The non-transitory computer-readable medium of claim 14, wherein the program further causes the at least one computing device to determine an account associated with the request.

* * * * *